（12）United States Patent
Nijim et al.

(10) Patent No.: US 10,250,917 B1
(45) Date of Patent: Apr. 2, 2019

(54) INSERTING SECONDARY CONTENT AFTER PAUSE IN DELIVERY

(71) Applicant: Cox Communications, Inc., Atlanta, GA (US)

(72) Inventors: Yousef Wasef Nijim, Cumming, GA (US); James Alan Strothmann, Johns Creek, GA (US); Jay Paul Langa, Cumming, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 15/136,820

(22) Filed: Apr. 22, 2016

(51) Int. Cl.
| | | |
|---|---|---|
| *H04N 21/234* | (2011.01) | |
| *H04N 21/274* | (2011.01) | |
| *H04N 21/442* | (2011.01) | |
| *H04N 21/488* | (2011.01) | |
| *H04N 21/81* | (2011.01) | |
| *H04N 21/6587* | (2011.01) | |
| *H04N 21/845* | (2011.01) | |
| *H04N 21/239* | (2011.01) | |
| *H04N 21/472* | (2011.01) | |
| *H04N 21/262* | (2011.01) | |

(52) U.S. Cl.
CPC ... *H04N 21/23424* (2013.01); *H04N 21/2393* (2013.01); *H04N 21/262* (2013.01); *H04N 21/274* (2013.01); *H04N 21/44204* (2013.01); *H04N 21/47217* (2013.01); *H04N 21/4882* (2013.01); *H04N 21/6587* (2013.01); *H04N 21/812* (2013.01); *H04N 21/814* (2013.01); *H04N 21/8126* (2013.01); *H04N 21/8455* (2013.01)

(58) Field of Classification Search
CPC ......... H04N 21/23424; H04N 21/2393; H04N 21/262; H04N 21/433; H04N 21/44204; H04N 21/6587; H04N 21/812
See application file for complete search history.

(56) References Cited

U.S. PATENT DOCUMENTS

| | | | | |
|---|---|---|---|---|
| 2003/0236905 | A1* | 12/2003 | Choi | H04L 29/06 709/231 |
| 2007/0276925 | A1* | 11/2007 | La Joie | G06Q 30/0256 709/219 |
| 2008/0052231 | A1* | 2/2008 | Moscal | G06Q 20/10 705/40 |
| 2008/0109362 | A1* | 5/2008 | Fransdonk | G06Q 30/06 705/51 |

(Continued)

Primary Examiner — Joshua D Taylor
(74) Attorney, Agent, or Firm — Merchant & Gould

(57) ABSTRACT

Linear content that is recorded often includes secondary content that is no longer relevant to the consumer, and lacks secondary content that is relevant to the consumer, such as, emergency alerts, which are time dependent in their relevancy. Inserting secondary content during playback of the recorded content is challenging, as it may interrupt playback and degrade the consumer's viewing experience. Therefore, systems and method are provided herein that exploit pauses in the playback, such as when the content is loaded on a viewing device or a consumer uses trick play options, to insert relevant secondary content without further interrupting the viewing experience, to reduce storage requirements for a cloud-based recording and playback system, and to improve the user experience thereof

20 Claims, 5 Drawing Sheets

(56) References Cited

U.S. PATENT DOCUMENTS

| | | | | |
|---|---|---|---|---|
| 2008/0281686 | A1* | 11/2008 | Houtzer | G06Q 30/02 |
| | | | | 705/14.5 |
| 2009/0106405 | A1* | 4/2009 | Mazarick | H04L 63/0236 |
| | | | | 709/222 |
| 2009/0222851 | A1* | 9/2009 | Talmi | H04N 7/17336 |
| | | | | 725/32 |
| 2011/0167486 | A1* | 7/2011 | Ayloo | G06Q 10/00 |
| | | | | 726/7 |
| 2011/0202956 | A1* | 8/2011 | Connelly | H04N 21/433 |
| | | | | 725/38 |
| 2011/0264530 | A1* | 10/2011 | Santangelo | G06Q 30/02 |
| | | | | 705/14.64 |
| 2016/0275562 | A1* | 9/2016 | Elcock | G06Q 30/0269 |

* cited by examiner

INSERTING SECONDARY CONTENT AFTER PAUSE IN DELIVERY

BACKGROUND

Consumers of television services greatly enjoy being able to record linear content items to re-watch content items after an initial time of broadcast or to shift when they view specific content items to a more convenient time. Consumers, however, do not always have access to hardware capable of recording linear content items in their homes, such as a Digital Video Recorder (DVR), and may instead use cloud-based Digital Video Recorders (cDVR) to store content with a service provider. Recording content items on a cDVR offers the added benefits for consumers that no bulky equipment (or less bulky equipment) needs to be installed or maintained in the home and that the recorded content may be accessed on the go or from multiple locations. For example, a consumer may have recorded content on a cDVR and may access that content while on vacation, travelling to work, or otherwise away from the home.

Many content providers provide secondary content along with primary content, which can be complicated when users time shift content or view it in a new location. As will be understood, content can be roughly divided into two classes: primary content and secondary content. Primary content corresponds to the content items that are listed in program guides, while secondary content corresponds to the content items that are included with the primary content items. Examples of secondary content items include content items that overrun their initial timeslots (e.g., an overtime sports broadcast is primary content in its timeslot, but secondary content in another timeslot), advertisements, public service announcements, weather reports, news or stock tickers, emergency alert messages, and network condition reports. Secondary content often loses its relevancy when content is time shifted, such as, for example, secondary content of a tornado warning, which may no longer be in effect when the recorded content is played back at a later time.

Providing consumers with relevant secondary content at a time and location at which the primary content is viewed and at points in the primary content item that do not diminish the viewing experience is of particular importance to content providers that enable consumers to record and recall content items via cDVR.

SUMMARY

Aspects of the present disclosure provide for systems and methods to provide consumers with an improved viewing experience and to improve the performance of cDVR systems via inserting secondary content after pauses in delivery of recorded content. In addition to providing consumers with desired recorded content, the cDVR systems provide secondary content at natural breaks within the primary content (e.g., commercial breaks) and in response to pauses in the consumption of the primary content. In various aspects, the pauses are introduced via trick play commands from the consumer and from network induced breaks in delivery of the primary content, such as when the primary content item is initially provided to the consumer or when network congestion or connectivity causes delivery of the primary content item to be paused as content is delivered at a slower rate than it is consumed.

By exploiting these pauses to deliver secondary content, the service provider can provide a better user experience to the consumer with fewer or shorter interruptions in the primary content and more relevant secondary content. The service provider can also use less memory in its cDVR system and less bandwidth when providing cloud-stored content, which improves the cDVR and content delivery networks. The consumer device can also conserve memory when caching or buffering content, freeing the consumer device for processing other activities and improving their responsiveness.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

As briefly described above, aspects of the present disclosure provide for systems and methods to provide consumers with an improved viewing experience, to improve responsiveness of viewing devices, and to improve the performance of cDVR systems themselves via triggering secondary content on pause.

By monitoring content delivery for pauses in the primary content, the content provider can insert secondary content on resumption of playback without adding further interruptions to the primary content item, thus improving the consumer's viewing experience. Additionally, the provision of secondary content may be used to cover pauses and loading times for the primary content, thus enabling the content provider and consumer to save on bandwidth and memory storage costs when providing content from cDVRs and providing the consumer with the appearance of pause-less content delivery.

Figure 1:
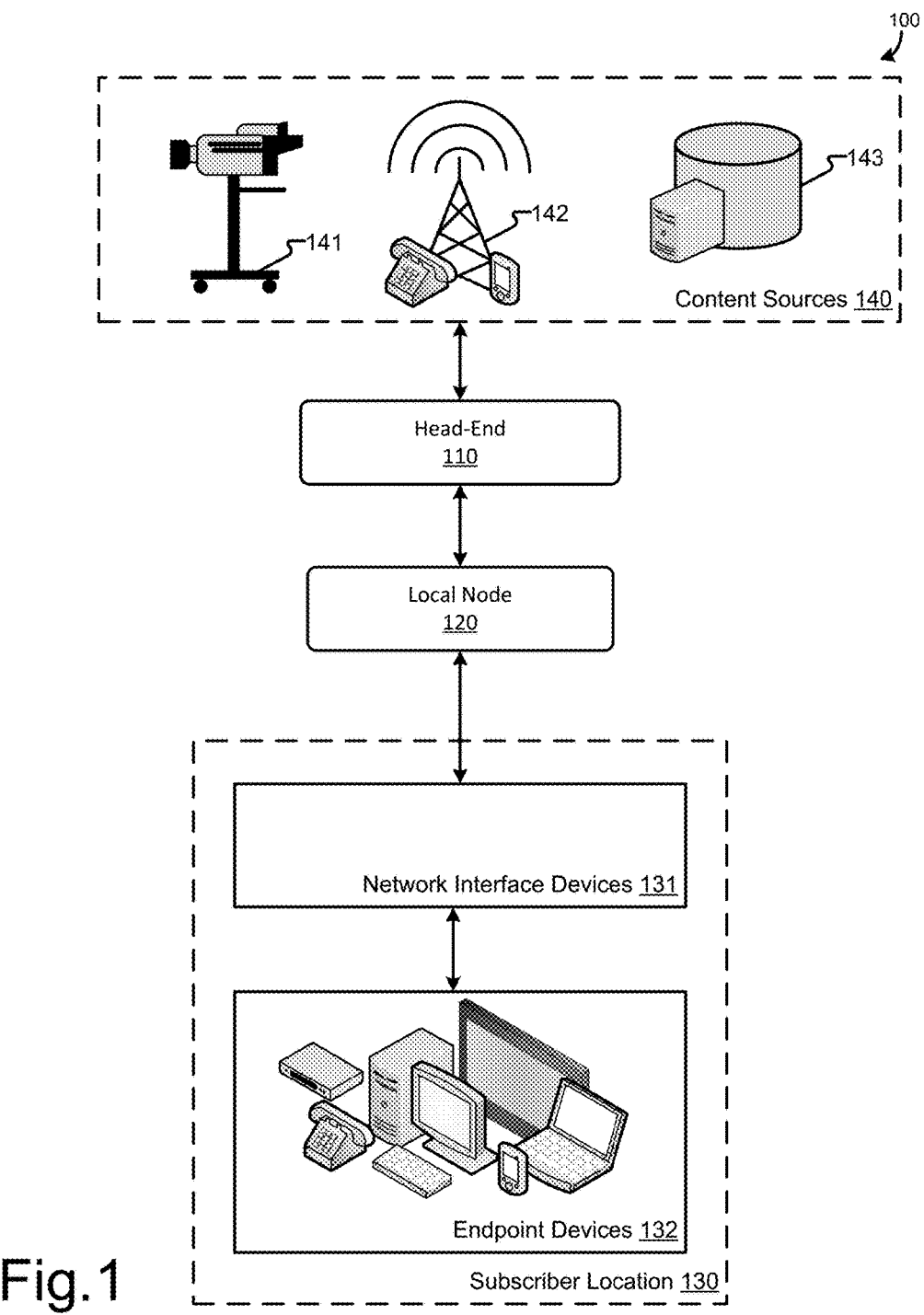
FIG. 1 illustrates an example Content Delivery Network with which aspects of the present disclosure may be practiced.

FIG. 1 illustrates an example Content Delivery Network (CDN) 100 with which the present disclosure may be practiced. Services originate at a head-end 110, which distributes services to local nodes 120, which in turn serve subscriber locations 130. The CDN 100 provides tiers of caching and processing, from which data are requested and transmitted over a physical network (which may include wired and wireless components), enabling the distribution of data and services for quick access by consumers at lower levels of the tier from higher levels of the tier where the content originates. Content may remain cached at a given level in the tier of the CDN 100 according to a Time to Live (TTL) value associated with the content and/or the tier to allow for the redistribution of content to lower tiers without requiring it to be delivered again from a higher tier. The content will expire according to its TTL value so that the CDN 100 may reclaim the storage space used to cache that content item. Services include, but are not limited to cable television service, internet service, and telephone service, and one consumer may be provided with one or more services by the service provider over the CDN 100.

The CDN 100 illustrated in FIG. 1 represents components that may be used in conjunction with a Hybrid Fiber-Coaxial (HFC) network or other physical network used to link subscriber locations 130 with content sources 140 to provide content (generally referred to herein as the HFC network). Content sources 140 include television stations 141, telephone networks 142, and content databases 143. Television stations 141 include local broadcast stations, cable network stations, satellite network stations, and governmental agencies that piggyback on television signals to provide alerts (e.g., the National Weather Service, the Department of Justice (AMBER alerts), the Federal Emergency Management Agency). Telephone networks 142 include wireless networks, such as mobile phone cells in a cellular telephone network, as well as wired networks, such the trunk lines between cell towers and/or telephone exchanges. Content databases 143 include local content databases, such as the servers used by the service provider to store and provide VOD content or a cDVR system, and remote content databases, such as those provided via the Internet or by other service providers. In various aspects, the content sources 140 are provided by the same entity that maintains the CDN 100, while in other aspects, the CDN 100 may be maintained by a different entity. For example, a first cable service provider may maintain a CDN 100 and several content databases 143, but a consumer may access stored content from a different cable service provider's content databases 143 over the CDN 100 of the first cable service provider.

The head-end 110 is in communication with the local node 120 via fiber optic cables, and the local node 120 is in communication with the subscriber location 130 via fiber optic cables (when fiber to the premises (FTTP) is installed), coaxial cables, telephone lines, or radio waves (e.g., cellular signals, Wi-Fi, WiMAX). Similarly, the head-end 110 may be in communication with the content sources 140 via various transmission media, including, but not limited to, fiber optic cables, coaxial cables, telephone lines, and radio waves.

Although, for purposes of simplicity, only one local node 120 and one subscriber location 130 are illustrated in FIG. 1, one of ordinary skill in the art will understand that a head-end 110 may be in communication with multiple local nodes 120 and each local node 120 may be in communication with multiple subscriber locations 130. One of ordinary skill in the art will also recognize that a head-end 110 may be implemented in a single office or facility, or in a ring of multiple offices or facilities that act as distributed hubs of the head-end 110, which may be in communication with each other via fiber optic cables or radio waves, such as, for example, microwave transmissions.

At the subscriber location 130, services are received from the local node 120 by network interface devices 131, such as, for example, cable modems, set top boxes (STB), cable cards, and Voice over Internet Protocol (VoIP) telephone interfaces. A network interface device 131 interfaces between the local node 120 and endpoint devices 132, and may convert signals comprising the services from one transmission medium to another transmission medium (e.g., between coaxial cable, Ethernet cable (category-6, category-6e, etc.), telephone cable (RJ11, RJ14, etc.), and radio waves), translate signals between encapsulation modes (e.g., shift signals to heterodynes, change signal standards, change modulation schemes), cache or buffer data for burst transmission, apply forward error correction, and route signals to the appropriate endpoint devices 132.

Endpoint devices 132 are devices used by consumers to consume content delivered over the CDN 100, such as, for example, televisions, Digital Video Recorders (DVR), computers (including desktops, laptops, tablets, netbooks, personal media servers, video game systems, etc.), landline phones (e.g., VoIP consoles, Plain Old Telephone Service (POTS) consoles), mobile phones, fax machines, networked printers, internet radios receivers, etc. In various aspects, endpoint devices 132 may incorporate network interface devices 131, such as, for example, a combination STB and DVR or a cellphone with a network interface.

Commands from a consumer may be sent to the network interface devices 131 or the endpoint devices 132 via integrated controls (e.g., buttons, switches, knobs, and touch screens), wired devices in communication with the device (e.g., wired keyboards, mice, and console controllers), and wireless control devices in communication with the device (e.g., remote controls, wireless keyboards, mice, and console controllers). In various aspects, wireless control devices may be associated with one network interface device 131 or endpoint device 132, or may be associated with multiple network interface devices 131 and/or endpoint devices 132 (e.g., a universal remote control) serially or simultaneously in communication with multiple devices.

Television services delivered over the CDN 100 may multiplex several different content items for concurrent transmission over shared transmission media. In a radio frequency television (RFTV) implementation, each television station 141 is assigned a frequency or wavelength on which its content is transmitted, whereas in an internet protocol television (IPTV) implementation, each subscriber location 130 is assigned a frequency or wavelength on which content specific to that subscriber location 130 is delivered. As will be understood, when a consumer changes channels under RFTV, a tuner in a network interface device 131 or an endpoint device 132 changes the frequency to which it is tuned, whereas when a consumer changes channels under IPTV, a request is sent to the local node 120 or head-end 110 to encapsulate the content of the newly requested channel in a stream of internet protocol (IP) packets that are delivered to the consumer. In an IPTV implementation, due to the distance between the consumer and the service provider, navigation requests (of menus or of content) may introduce lag or delays from the time of request to the time of delivery for content requested by a consumer.

As one of ordinary skill in the art will understand, the CDN 100 will include various computer devices, which are used to manage and control the provision of service via the HFC network. For example, the encoding of a telephone call may be managed by a computer controlling the On-Off Keying (OOK) of a laser diode over a fiber optic transmission medium. Computers used in the CDN 100 include processors and memory storage devices, which store instructions that when executed by the processors enable the provision of services. Memory storage devices are articles of manufacture that include computer-readable storage media. The term computer-readable storage media does not include transmission media, but refers to hardware media used to store desired information for access by a computer. Examples of computer-readable storage media include, but are not limited to, RAM, ROM, EPROM, EEPROM, solid state memory, such as flash memory, optical storage, such as CD-ROMs and DVDs, and magnetic storage devices, such as magnetic tape and magnetic disks.

Figure 2:
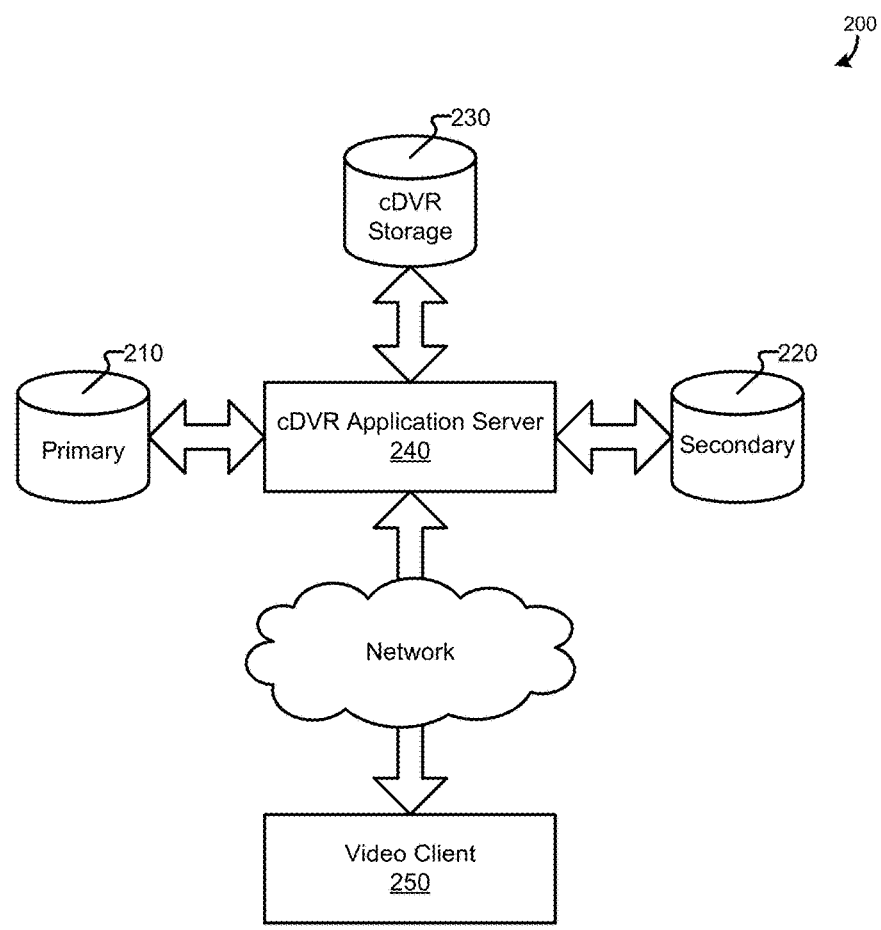
FIG. 2 illustrates an example block diagram of an improved cDVR system.

FIG. 2 illustrates an example block diagram of an improved cDVR system 200. Recorded content is delivered via a physical network in conjunction with a CDN 100, such as that illustrated in FIG. 1, to a video client 250. The video client 250 is operable to receive content, make requests for access to content, and transmit trick play commands related to content stored by the cDVR system 200. The requests are handled via the CDN 100 by a cDVR application server 240, which accesses primary content sources 210, secondary content sources 220, and the cDVR storage 230 to record and recall content for the consumer using the video client 250. A given consumer may access the cDVR system 200 via more than one video client 250, and multiple consumers may access the cDVR system 200 via the same video client 250. For example, a first client may access the cDVR system 200 via two STBs running different video clients 250. Alternatively or in addition, a first consumer may log into a video client 250 with an associated profile and then log out for a second consumer to log into the video client 250 with a different associated profile.

The primary content source 210 includes linear and non-linear content available to the consumers via the service provider. For example, the broadcasts of television programs carried on the content provider's network, which may be temporarily spooled or cached on computer-readable storage media of the CDN 100 or directly transmitted over the physical network, from television networks are included as primary content sources 210.

The secondary content source 220 includes linear and non-linear content available to the consumers via the service provider. For example, secondary content sources 220 include the National Weather Service, the Emergency Alert System, and other providers of alerts to consumers for dangerous conditions. In some aspects, secondary content sources 220 may also include advertisement servers (operated by the service provider or a third party), from which advertisements may be pulled for insertion into a recorded content item. In yet other aspects, the secondary content sources 220 may include a service provider server, operable to provide the consumer with secondary content of messages from the service provider, such as for example, network condition messages, news alert messages, weather forecast messages, etc.

In various aspects, content from the secondary content source 220 is inserted into the linearly delivered primary content (e.g., an Amber alert that interrupts a broadcast), overlaid over the linearly delivered primary content (e.g., a school closings news ticker displayed over a portion of a broadcast), adjusts an aspect ratio of the linearly delivered primary content for co-display (e.g., a flash flood warning takes up a portion of the screen while the broadcast continues in another portion of the screen) by the service provider. In other aspects, the secondary content source 220 is used by the networks to insert the secondary content into the feeds comprising the primary content sources 210. The service provider may also use the secondary content source 220 to insert secondary content into the recorded content that was not present at the time the content item was recorded (e.g., the content item was recorded on a sunny day, but is watched on a rainy and thundering day, and the service provider may insert a thunderstorm warning when the item is watched) or reinsert secondary content that was stripped from the recording (e.g., the service provider may store a broadcast in the cDVR storage 230 without advertisements, and reinsert the advertisements from a secondary content source 220 on playback).

The cDVR storage 230 comprises the computer readable storage media on which content from the primary content source 210 is recorded in response to a consumer's request to record content. The cDVR storage 230 may comprise a distributed system of memory storage devices and servers or may be provided as a dedicated device for a given consumer. In various aspects, the service provider manages the cDVR storage 230 by consumer (allocating specific resources and storage space to a given consumer in a distributed system), by content item (allocating access to specific recordings by lists of consumers who requested to record the given content item), or by device (allocating a cDVR device for a given consumer or consumers), and combinations thereof.

In various aspects, the video client 250 is a software application that is executed on a network interface device 131 or an endpoint device 132 local to the consumer. For example, the video client 250 may be stored in a memory storage device associated with an STB to provide content and trick play options to the consumer via an associated television and control devices. In another example, the video client 250 may be stored in a memory storage device associated with a mobile device, such as, for example, a tablet, laptop, or smart phone, to enable the mobile device to receive content and manipulate that content via trick play options.

As will be understood by one of ordinary skill in the art, trick play options include playback modes and commands for content items that are offered in addition to the linear playback of a content item. Example trick play options include, but are not limited to: pause, record, fast forward (at various speeds), rewind (at various speeds), skip ahead (at various lengths of time), fall back (at various lengths of time), next chapter/scene, previous chapter/scene, set bookmark, jump to bookmark, slow motion, etc.

When a consumer requests to record a content item, for example by selecting a record trick play option via a remote control or playback controls in the video client 250 while viewing a content item or scheduling its recording, the cDVR application server 240 is operable to receive the content from the primary content source 210, which may include embedded secondary content (e.g., a broadcast of a television show that includes advertisements), store the content in cDVR storage 230, and associate the stored content with the consumer for later retrieval. In various aspects, when the consumer has not subscribed to a cDVR service, the cDVR application server 240 will transmit to the video client 250 a message explaining terms for a la carte usage of the cDVR system 200 (e.g., storing an individual recording without having a subscription that includes usage of the cDVR system 200). In various aspects, the message explaining a la carte usage may indicate that a charge will be applied to the subscriber's account, enable the provision of additional secondary content on playback of the recorded content, explain how much content may be stored a la carte, explain the deletion policy, download speeds, and quality parameters for a la carte storage, and/or suggest that the consumer sign up for subscription-based cDVR service.

As the content item is recorded and stored to the cDVR storage 230, the cDVR application server 240 is operable to identify natural pauses in the primary content item and to insert triggers for secondary content playback into the recorded content. In various aspects, the cDVR application server 240 identifies secondary content embedded with the primary content. For example, a commercial break may be identified or a weather alert that overlays or interrupts the primary content is identified by the cDVR application server 240 so that the associated secondary content may be removed before storing the primary content and/or a trigger is inserted so that additional or replacement secondary content may be inserted at a relevant point in the primary content. For example, the weather alert may be stripped from the content before being recorded to the cDVR storage 230 and a trigger inserted at the beginning or the end of the commercial break so that secondary content can be inserted at playback of the recorded content without interrupting the primary content. Triggers may also be inserted at scene changes, the start of the primary content or the end of the primary content. In various aspects, secondary content embedded in the primary content is identified by codes in the content stream (e.g., an International Standard Audiovisual Number (ISAN), a Universal Material Identifier (UMID), ad-ID codes, Industry Standard Coding Identification (ISCI) codes), changes in images comprising the audio stream, proximity of I-frames within the content stream, times known to the service provider, event transitions in the content stream, or other methods which will be known to those of ordinary skill in the art. In various aspects, instead of recording the secondary content, the codes for the secondary content are recorded so that the secondary content sharing the same code may be retrieved from the secondary content sources 220, thus reducing the memory requirements for operating the cDVR system 200.

When a consumer requests recorded content to be played back, the cDVR application server 240 retrieves the indicated content from cDVR storage 230 and transmits it to the video client 250. In aspects that include a trigger at the beginning of the content item, secondary content is provided for playback on the video client 250 prior to the primary content item beginning playback (e.g., as a pre-roll). For example, a network condition splash screen may be provided as secondary content to alert a consumer of expected network conditions during playback (e.g., an estimated speed for provision at a given quality of video and audio) and allow the consumer to adjust the quality of video and audio to be provided. In various aspects, the secondary content is provided at a lower quality than what the CDN 100 is capable of seamlessly transmitting to the video client 250 at the time, so that the primary content can be buffered on the video client 250 while the consumer is presented with alternative content. For example, if a CDN 100 is capable of uploading files to the video client 250 at X Megabits per second (Mbps), secondary content that is played back at (X-Y) Mbps may be provided at at least (X-Y) Mbps while the primary content is simultaneously provided at up to Y Mbps and buffered in the video client 250 for playback once the secondary content's playback is complete. Additionally, the video client 250 may provide secondary content in a trick-play-disabled mode, such that trick play options are not available when the secondary content is being played back, or with limited trick play options available (e.g., only pause and 2x fast forward available, only pause and rewind available).

During playback of the recorded content item, when a pause in the playback of the content item is detected, the cDVR application server 240 inserts secondary content into the stream provided to the video client 250. A pause may be detected, for example, when a pause trick play command is received by the cDVR application server 240, when an interruption in service is noted (e.g., a mobile user loses signal temporarily, a buffer on the video client 250 is depleted), or when a trigger occurs in the content item preceding where secondary content was originally embedded in the primary content item. For example, when a consumer signals a pause trick play command, the playback of the recorded content will be suspended, and secondary content will be provided for when the consumer signals for a resumption in playback, followed by resuming playback of the primary content item.

Similarly, secondary content may be inserted when a resumption from a pause is detected, for example, when an unpause trick play command (e.g., a second pause trick play command or a play command received after a pause trick play command) is received by the cDVR application server 240, when service is restored after an interruption in service, or when a trigger occurs in the content item following where secondary content was originally embedded in the primary content item. For example, when a consumer signals a pause trick play command, the playback of the recorded content will be suspended, and when the consumer signals for a resumption in playback, one or more secondary content items will be provided in the stream provided to the endpoint device 132 followed the primary content item.

Providing secondary content on resumption of playback enables the service provider to save bandwidth and the consumer's endpoint device 132 to conserve memory. Instead of continuing to fill a buffer with the primary content item while playback is paused, which the consumer may not continue watching (or continue watching on a different endpoint device 132), the service provider may cease transmitting content or transmit secondary content to pre-load in the event that the consumer resumes playback on the same endpoint device 132. As will be appreciated, secondary content may be provided at a lower quality than primary content (and thus require less bandwidth to transmit or memory space to store for an equivalent length of content) without the consumer minding. By playing secondary content when playback of the recorded content resumes, the service provider is given additional time to build a buffer on the video client 250 with the primary content, so that the consumer experiences fewer perceived interruptions in content delivery.

In various aspects, when secondary content is displayed in response to playback resuming (i.e., after a pause), the secondary content that was originally embedded when the content item was recorded is shifted forward, while in other aspects new secondary content is selected for inclusion in playback. For example, a commercial break appearing at the halfway point of a program may have originally included four advertisements, and two of which are shifted to the initial pause when playback starts, leaving the commercial break with two advertisements, thus shortening the perceived interruption of the commercial break, retaining the advertisements that were paid for in the primary content, and allowing the service provider to improve the user experience by covering load times with secondary content. Alternatively or additionally, new or different secondary content can be inserted after a pause. Continuing the above example, new secondary content, such as a weather alert or network condition message, may be inserted after a pause with the other secondary content or without other secondary content.

Figure 3:
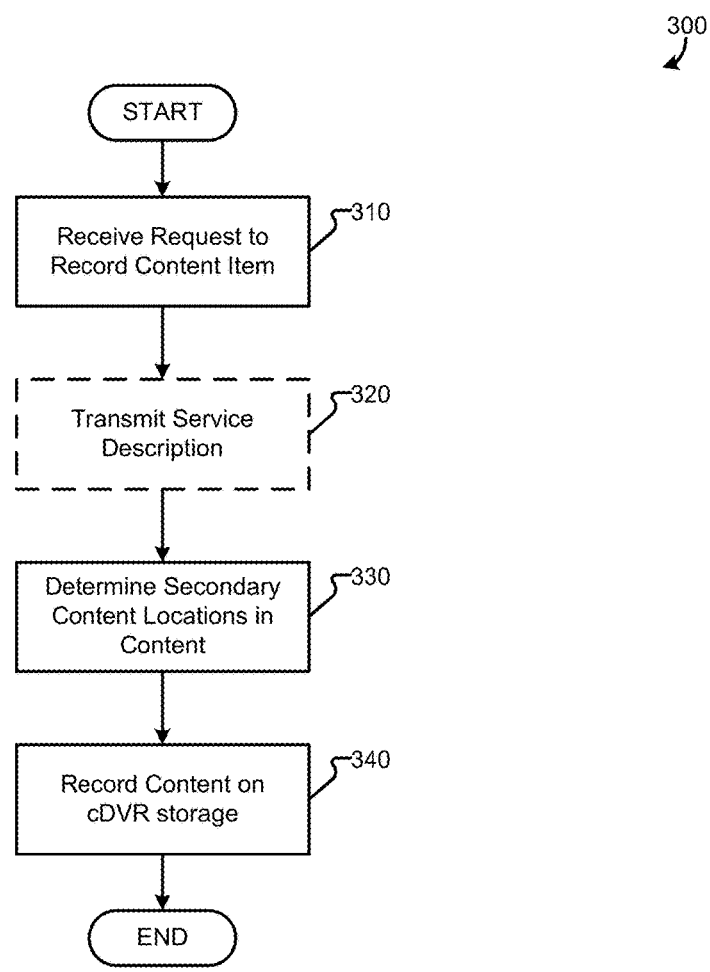
FIG. 3 is a flowchart illustrating general stages in an example method for handling consumer requests to record content to trigger the insertion of secondary content after a pause in delivery.

FIG. 3 is a flowchart illustrating general stages in an example method 300 for handling consumer requests to record content to trigger the insertion of secondary content after a pause in delivery. Method 300 begins at OPERATION 310, where a request to record a content item is received from the consumer. In various aspects, the request may be a trick play option related to a currently viewed content item (e.g., the consumer pressed a "record" button on a remote control to record the content being transmitted to the consumer) or the request may be a scheduled request to record a content item at a future time (e.g., the consumer signals the service provider that all episodes of a television program are to be recorded, that a given time block on a given channel is to be recorded, that a given content item is to be recorded).

In some aspects, method 300 proceeds to OPTIONAL OPERATION 320, where a service description is transmitted to the consumer. A service description may be transmitted to a consumer in response to the request to record being the first time that a consumer requests to record content via a cDVR system 200, when the consumer is not subscribed to the cDVR system 200 but is recording content a la carte, when terms of service have changed, when the consumer is running into a storage cap (e.g., the request will record more content than the terms of service allow without deleting existing recordings), when the consumer is forbidden from recording a given content item via the cDVR system 200, etc. The service description may be presented as an overlay of the content or menu that the consumer is viewing, as a rearrangement of the viewing area of a display device, devoting space to the service description and a reduced-size playback area for the linear content.

The service description, in various aspects, sets out the terms of use for the cDVR system 200 and may request the consumer to acknowledge the terms or accept fees for the service to be provided (e.g., a one-time charge to upgrade a storage cap, accepting modification of the recorded content from the broadcasted version to include additional or shifted secondary content). If the consumer chooses not to accept the terms or the fees (if presented), method 300 will conclude, otherwise method 300 will proceed to OPERATION 330.

At OPERATION 330 secondary content locations in the content to be recorded are determined. For example, the locations in the broadcast of the primary content that are interrupted by, overlaid by, or re-arranged by the presentation of secondary content are identified during the recording process. In various aspects, triggers are inserted into the stream at the locations/times that the secondary content are presented in the stream so that the system will be able to identify where/when an interruption had originally occurred in the primary content item so that on subsequent playback secondary content may be inserted without adding further interruption to the playback of the primary content.

At OPERATION 340 the content is stored in the cDVR storage 230. In various aspects, the content is stored as a Motion Picture Experts Group (MPEG) file, but other audiovisual file formats and encapsulations known to those of ordinary skill in the art may also be used. The cDVR storage 230 in different aspects may store both the primary and secondary content, or may store only the primary content in the audiovisual file format. In aspects that do not store the secondary content in the cDVR storage 230 in an audiovisual file format, a text file may store identifiers for the secondary content (e.g., as ISAN, UMIN, ad-ID or ISCI codes) so that the secondary content is optionally retrieved or updated from the secondary content source 220 when playback is requested for the secondary content in the recorded content item. For example, when the recorded content item included a secondary content item of an emergency weather alert applicable at the time of recording, secondary content of a weather report applicable to the time of playback may be retrieved from the secondary content source 220 to replace the emergency weather alert. By not storing the secondary content in the cDVR storage 230, secondary content items may be shared among several affected recorded content items from a single copy in the secondary content source 220, and memory is thereby conserved in the cDVR system 200.

Figure 4:
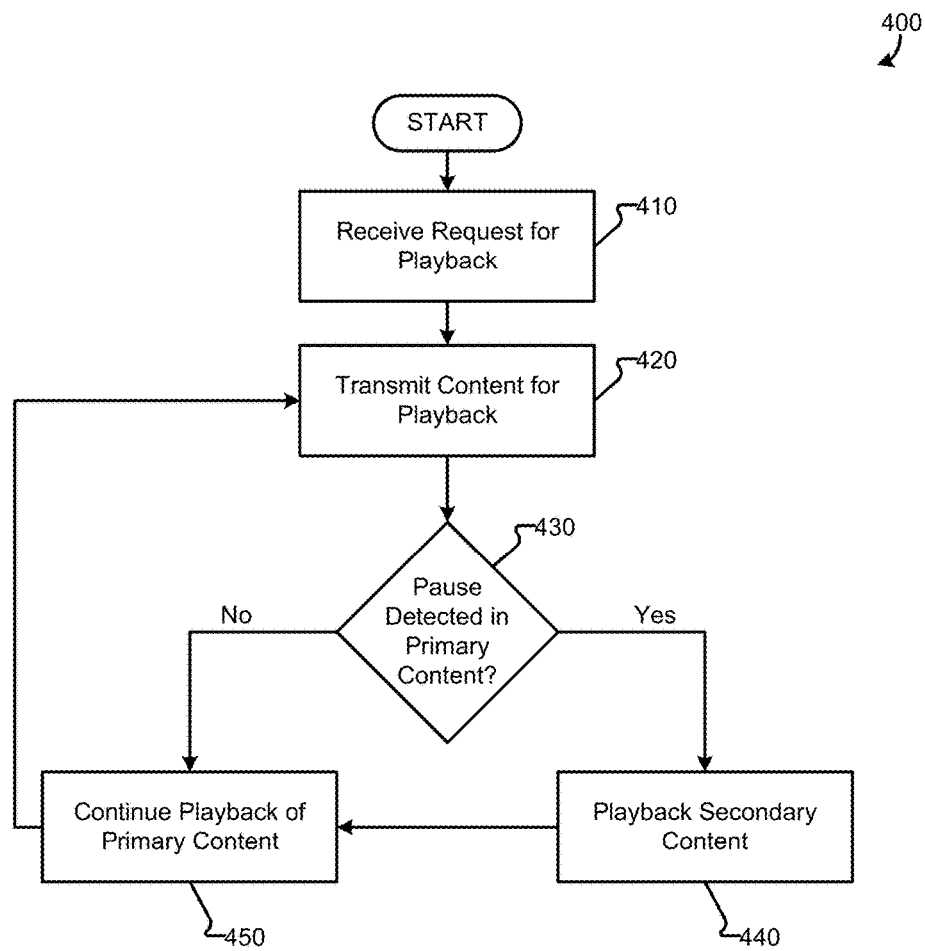
FIG. 4 is a flowchart illustrating general stages in an example method for transmitting recorded content for playback while exploiting pauses in the recorded content for including secondary content.

FIG. 4 is a flowchart illustrating general stages in an example method 400 for transmitting recorded content for playback while exploiting pauses in the recorded content for including secondary content. Method 400 begins at OPERATION 410, where a request for playback is received. In various aspects, a request for playback may be received from the device from which the record request was received or from a different device. For example, a consumer may send a request to record a content item from an STB in the home, but request playback from a tablet computing device while riding a train to work or from a different STB in the home. The request for playback identifies the capabilities of the endpoint device 132 on which playback is desired (and/or an associated or integrated network interface device 131), such as, but not limited to: the screen resolution, screen refresh rate, screen aspect ratio, processing speed, available memory, maximum data throughput rate, network connection strength (e.g., Signal to Noise ratio), connection type (e.g., wired, Wi-Fi, cellular), location (e.g., via region, Global Positioning System coordinates, access network), audio capabilities (e.g., speakers or headphones used, surround-sound capability, stereo capability), etc. The request for playback will also identify the consumer (or the associated account) requesting playback and the content item for which playback is requested.

In various aspects, preferences for playback may be included in the request or looked up by the service provider based on account or consumer profile preferences. Playback preferences may include, but are not limited to: preferred video quality, preferred audio quality, preferred buffer size, options for delivery channel (e.g., use cellular service delivery when Wi-Fi connection strength falls below a threshold), error correction preferences (e.g., enable/disable forward error correction), whether to automatically delete a content item from cDVR storage 230 after playback, whether to automatically queue a second content item from cDVR storage 230 (if available) or a primary content source 210 for playback after playing back a first content item from cDVR storage 230, billing information and preferences (if applicable), audio volume preferences, Secondary Audio Programming (SAP) preferences, closed captioning preferences, aspect ratio conversion preferences (e.g., pan/tilt and scan, matting), etc.

Proceeding to OPERATION 420, secondary and primary content are transmitted to the consumer to begin delivery of recorded content for playback. In various aspects, content is provided from the cDVR storage 230 or from the cDVR storage 230 and the secondary content source 220. Content may be formatted according to the consumer preferences when transmitted, or reformatted by the video client 250 on reception. For example, when a content item is originally intended for a first aspect ratio, but the endpoint device 132 has a second aspect ratio for displaying content, the content may be formatted to the second aspect ratio (by cropping, letter/pillar/window boxing, panning-and-scanning (or reverse), tilting-and-scanning (or reverse), etc.). In different aspects, the service provider may convert the recorded content to the second aspect ratio before transmitting it to the consumer, or the service provider may transmit the recorded content to the consumer in the first aspect ratio and allow the video client 250 to convert aspect ratios. In another example, a service provider may select secondary content for transmission that is appropriate for the location of playback, such as, for example, a weather report for the location that the consumer is viewing the recorded content from rather than a location from which the content was requested to be recorded.

In various aspects, the secondary content is transmitted to the consumer as a pre-roll for the primary content; being displayed before the primary content is displayed. The secondary content may be stored on the network interface device 131 or endpoint device 132 as part of a cache for later replay in the event of a pause and resumption from the pause, or it may be played back transiently; being played back without the network interface device 131 or endpoint device 132 retaining the data after it has been used for playback. When the secondary content is cached, it may be transmitted along with the primary content for playback when a pause concludes (e.g., a consumer resumes playback, a service interruption is solved, or a commercial break begins/ends) or in anticipation of a pause. For example, the secondary content used in a pre-roll (or another secondary content item cached locally to the consumer) may be presented from the cache at a later time in playback or the cDVR application server 240 may embed secondary content items into the stream of content for each pause in playback.

Method 400 then proceeds to DECISION 430 to determine whether a pause has occurred in the playback of the content. When a pause is consumer instigated (e.g., using pause trick play), the pause is detected by receiving signals from the video client 250 indicating that the consumer has request the stream of content to be paused or unpaused. When the pause is environmentally instigated (e.g., the consumer lost or regained signal to the service provider), it may be detected via a loss of a heartbeat signal from the endpoint device 132 or periodically polling the endpoint device 132 for connectivity information. When the pause is triggered by a break in the recorded content item (e.g., a break for secondary content that was present during recording), the cDVR application server 240 is operable to detect the pause by looking for triggers inserted into the recorded content item. In various aspects, how far into the recorded content item the cDVR application server 240 looks for triggers relative to the currently transmitted portion of the content item may vary. For example, a cDVR application server 240 may detect a trigger when it is to transmit the portion of the recorded content item that includes the trigger, while in other aspects, the cDVR application server 240 may look n seconds ahead in the recorded content item for triggers from the portion being transmitted, where n corresponds to: a processing and transmission time from the cDVR application server 240 to the endpoint device 132, a buffer size of the endpoint device 132, and combinations of processing and transmission time and the buffer size.

When the consumer has not manually initiated a pause in the playback of the primary content item for a given period of time or a natural pause in the primary content item is not detected for a given period of time (either environmentally instigated or triggered by a break in the recorded content item), the cDVR system 200 is operable automatically insert a pause. The length of time between pauses and the length of pauses themselves are both configurable by the cDVR system 220 for various lengths of time or amounts of content. For example, if a consumer does not pause the primary content item for ten minutes and the primary content item does not contain any other breaks (e.g., from commercial breaks present during the recording or loss of signal), the cDVR system 200 is operable to insert a pause and automatically resume from the pause to initiate the playback of secondary content. In another example, an automated pause may be inserted at the halfway point of a primary content item if no other pauses are detected prior to the halfway point.

As will be appreciated, the secondary content may be transmitted sequentially in time to the primary content (e.g., a service provider sends primary content and then secondary content) or in tandem with each other (e.g., with secondary content transmitted as an out-of-band signal) and assembled separately for playback. In some aspects, when a pause is detected from triggers in the recorded content, the cDVR application server 240 may allow a buffer of primary content to draw down in anticipation of the pause before transmitting the secondary content. For example, with a thirty second buffer, no new primary content will be transmitted within thirty seconds of a trigger until after the secondary content is transmitted, and the primary content buffer will be rebuilt while the secondary content is transmitted and played back. In other aspects, when a pause is detected from triggers in the recorded content, secondary content will be inserted into a stream of content by the cDVR application server 240 (in-band or out-of-band) in advance of the trigger, with the secondary content being stored in the buffer in anticipation of the consumer reaching the trigger in the content stream.

When a pause in delivery or playback of the primary content is detected, method 400 proceeds to OPERATION 440. When no pause in delivery of playback of the primary content is detected, method 400 proceeds to OPERATION 450.

At OPERATION 440 secondary content is played back upon conclusion of a pause. In various aspects, when secondary content is played back, some or all trick play options are disabled (e.g., fast forward, skip ahead, rewind, skip back, record, pause, etc. may be disabled). Depending on the delivery speed of the CDN 100, the quality level of the primary and secondary content, the memory capabilities of the network interface device 131 or endpoint device 132, and the length of the secondary content item, one or more secondary content items may be provided on conclusion of the pause. In various aspects, trick play options may be disabled at the endpoint device 132 (which will not accept the commands) or at the cDVR application server 240 (which will ignore transmitted requests for trick play operations).

In some aspects, the cDVR application server 240 also monitors the stream of content delivered to the endpoint device 132 for pauses in delivery of secondary content. Although trick play operations that include pause trick play operation may be disabled during the presentation of secondary content in some aspects, the delivery of secondary content may still be subject to interruption (e.g., service outages). In various aspects, when a pause is detected in the secondary content, additional secondary content may be provided, the interrupted secondary content item may be played back again, or the presentation of secondary content may conclude, and the presentation of primary content in the stream transmitted to the endpoint device 132 may resume.

Which secondary content items are provided varies in different aspects. For example, the secondary content items that were originally embedded with the primary content item when it was recorded may be retrieved from the secondary content source 220 to be re-embedded in the playback of the recorded content item (in the same or different orders or locations in the primary content item). In another example, similar secondary content items are retrieved from the secondary content source 220 to replace the originally embedded secondary content items (e.g., newer advertisements related to the same product/service, a weather report to replace an emergency weather alert). In yet another example, different or no secondary content items are provided in addition to or in place of the originally provided secondary content items (e.g., an emergency weather alert is removed, a first set of advertisements supplemented with a second set, a network condition report is provided instead of a commercial break).

At OPERATION 450 the primary content item continues in playback on the endpoint device 132 and the service provider continues delivery of the primary content item. In various aspects, some or all trick play options are disabled when recorded content is played back (e.g., record may be disabled). At the conclusion of playback for the primary content item, a post-roll of secondary content may be provided, a second primary content item (recorded or linear) may be provided, and method 400 may repeat or conclude.

Figure 5:
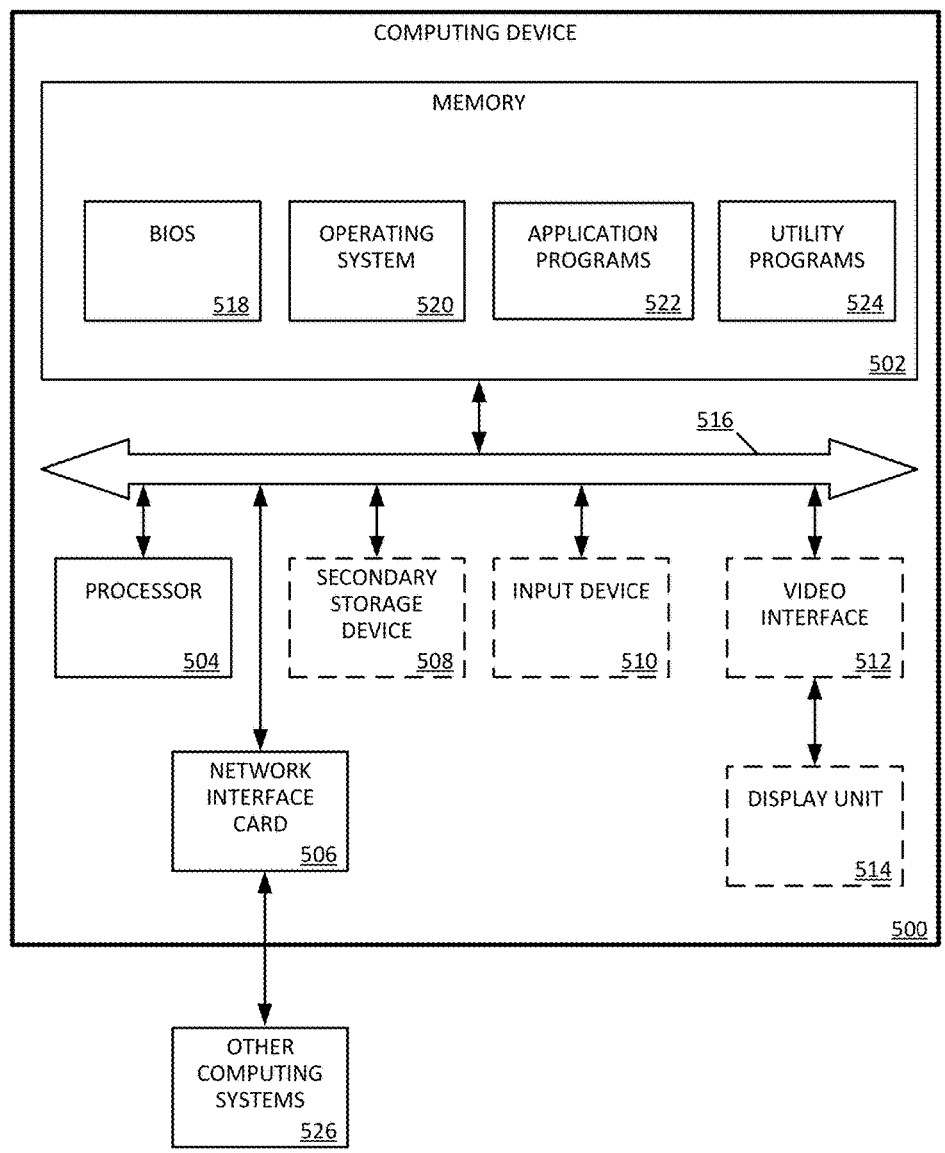
FIG. 5 is a block diagram illustrating example physical components of a computing device with which embodiments of the present disclosure may be practiced.

FIG. 5 is a block diagram illustrating example physical components of a computing device 500 with which embodiments of the present disclosure may be practiced. In some embodiments, one or a combination of the components of the cDVR system 200 are implemented using one or more computing devices like the computing device 500. It should be appreciated that in other embodiments, one or a combination of the components of the cDVR system 200 may be implemented using computing devices having hardware components other than those illustrated in the example of FIG. 5.

Computing devices may be implemented in different ways in different embodiments. For instance, in the example of FIG. 5, the computing device includes a memory 502, a processor 504, a network interface 506, an optional secondary storage device 508, an input device 510, a video interface 512, communicated with a display unit 514, and a communications medium 516. In other embodiments, the computing device 500 may be implemented using more or fewer hardware components or in combination with other types of computer systems and program modules.

The memory 502 includes one or more computer-readable storage media capable of storing data or computer-executable instructions that, when executed by processor 504, provide functionalities as described herein. In various embodiments, the memory 502 is implemented in various ways. For example, the memory 502 can be implemented as various types of computer-readable storage media to store various types of data or software instructions. For instance, in the example of FIG. 5, the memory 502 stores a Basic Input/Output System (BIOS) 518 and an operating system 520. The BIOS 518 includes a set of software instructions that, when executed by the processor 504, cause the computing device 500 to boot up. The operating system 520 includes a set of software instructions that, when executed by the processor 504, cause the computing device 500 to provide an operating system that coordinates the activities and sharing of resources of the computing device 500. The memory 502 also stores one or more application programs 522 that, when executed by the processing system 504, cause the computing device 500 to provide applications to users. The memory 502 also stores one or more utility programs 524 that, when executed by the processor 504, cause the computing device 500 to provide utilities to other software programs.

The optional secondary storage device 508 includes one or more computer-readable storage media, and may store data and computer-executable instructions not directly accessible by the processor 504. That is, the processor 504 performs an I/O operation to retrieve data or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, or other types of computer-readable storage media.

The processor 504 includes one or more processing units, which may include tangible integrated circuits that selectively execute computer-executable instructions. In various embodiments, the processing units in the processor 504 are implemented in various ways. For example, the processing units can be implemented as one or more processing cores. In another example, the processor 504 can comprise one or more separate microprocessors. In yet another example, the processor 504 can comprise Application-Specific Integrated Circuits (ASICs) that provide specific functionality. In yet another example, the processor 504 provides specific functionality by using an ASIC and by executing computer-executable instructions.

The computing device 500 may be enabled to send data to, and receive data from, a communication network via a network interface 506. In different embodiments, the network interface 506 is implemented in different ways, such as an Ethernet interface, a token-ring network interface, a fiber optic network interface, a wireless network interface (e.g., Wi-Fi, Wi-Max, etc.), or another type of network interface. The network interface 506 enables the computing device 500 to communicate with other computing systems 526, such as over a wireless network in a distributed computing environment, a satellite link, a cellular link, and comparable mechanisms. Other devices may include computer device(s) 500 that execute communication applications, storage servers, and comparable devices.

The optional input device 510 enables the computing device 500 to receive input from a user. Example types of input devices 510 include, but are not limited to: keyboards, mice, trackballs, stylus input devices, keypads, microphones, joysticks, touch-sensitive display screens, and other types of devices that provide user input to the computing device 500.

The optional video interface 512 outputs video information to an optional display unit 514. In different embodiments, the video interface 512 is implemented in different ways. For example, the video interface 512 may be a video expansion card. In another example, the video interface 512 is integrated into a motherboard of the computing device 500. In various aspects, the display unit 514 can be an LCD display panel, a touch-sensitive display panel, an LED screen, a projector, a cathode-ray tube display, or another type of visual display device. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) connector, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processor 504, the network interface 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of transmission medium.

Embodiments of the present disclosure may be used in various distributed computing environments where tasks are performed by remote processing devices that are linked through a communications network in a distributed computing environment.

Examples and aspects are described above with reference to block diagrams or operational illustrations of methods, systems, and devices. The functions/acts noted in the blocks may occur out of the order as shown in any flowchart or described herein with reference to FIGS. 3 and 4. For example, two processes shown or described in succession may in fact be executed substantially concurrently or the blocks may sometimes be executed in the reverse order, depending upon the functionality/acts involved. Similarly, the component articles of manufacture illustrated in the diagrams of systems and devices described herein may be rearranged, reordered, multiplied, or (depending on the functionalities involved) be implemented by more or fewer components than illustrated.

While certain examples and aspects have been described, other examples and aspects may exist. The foregoing description of the exemplary aspects has been presented for the purposes of illustration and description. It is not intended to be exhaustive or to limit the present disclosure to the precise form disclosed. Many modifications and variations are possible in light of the above teaching. It is intended that the scope of the present disclosure be limited not with this detailed description, but rather by the claims appended hereto.

We claim:

1. A system for providing enhanced playback of content recorded on a cloud-based Digital Video Recorder (cDVR), the system comprising:
    a processor; and
    computer readable storage media including instructions, which when executed by the processor enable the system to provide a cDVR application server, operable to:
    in response to receipt of a record command to record a primary content item to a cloud-based Digital Video Recorder (cDVR) storage remote from an endpoint device:
        determine if a subscription to record to the cDVR storage that is remote from the endpoint device exists;
        in response to confirming absence of a subscription to record to the cDVR storage, transmit a message to the endpoint device explaining terms for cDVR service before recording the primary content item;
        if a subscription to record to the cDVR storage exists, record the primary content item to the cDVR storage absent storing secondary content items included with the primary content item in the cDVR storage; and
        as the primary content item is recorded, insert one or more pre-roll triggers with the primary content item to trigger provision of secondary content comprising pre-roll content during playback of the primary content item;
    in response to a playback command:
        retrieve the primary content item from the cDVR storage that is remote from the endpoint device for playback on the endpoint device;
        provide the secondary content comprising the pre-roll content with the primary content item according to the one or more pre-roll triggers;
        transmit the primary content item as a stream to the endpoint device so that the pre-roll content is displayed before initially displaying the primary content item with trick play modalities disabled during the display of the pre-roll content;
        enable building a primary content item buffer on the endpoint device during provision of the secondary content comprising the pre-roll content;
        enable storing the secondary content comprising the pre-roll content in a cache of the endpoint device;
        monitor consumption of the stream on the endpoint device for pauses in the playback of the primary content item;
        retrieve the secondary content comprising the pre-roll content from the cache of the endpoint device for the stream in response to resuming playback of the stream from a pause; and
        in response to resuming playback of the stream from the pause, enable display of the secondary content comprising the pre-roll content before resuming playback of the primary content item with the trick play modalities disabled during the display of the pre-roll content.

2. The system of claim 1, wherein a pre-roll pause is present in the stream before the primary content item begins playback.

3. The system of claim 1, wherein the secondary content includes:
    weather forecasts;
    emergency alerts;
    network status messages;
    advertisements; and
    news.

4. The system of claim 1, wherein resuming playback of the stream from the pause is in response to the cDVR application server receiving a trick play mode request to resume playback.

5. The system of claim 1, wherein resuming playback of the stream from the pause is in response to the endpoint device regaining a lost communication session with the cDVR application server.

6. The system of claim 1, wherein resuming playback of the stream from the pause is in response to a trigger inserted into the stream by the cDVR application server, the trigger corresponding to a location in the primary content item to provision the secondary content comprising the pre-roll content.

7. The system of claim 1, wherein resuming playback of the stream from the pause is in response to an automated pause inserted into the stream by the cDVR application server in response to failing to detect a prior pause in transmission of the primary content item for a given period of time, wherein a length of the automated pause is configurable by the cDVR application server.

8. The system of claim 1, wherein the cDVR application server is further operable to strip the secondary content items embedded in the primary content item from the primary content item when recording the primary content item and instead store one or more identification codes for the secondary content items.

9. A method for providing enhanced playback of content recorded on a cloud-based Digital Video Recorder (cDVR) using a cDVR application server, the method comprising:
in response to receipt of a record command to record a primary content item to a cloud-based Digital Video Recorder (cDVR) storage remote from an endpoint device:
determining if a subscription to record to the cDVR storage that is remote from the endpoint device exists;
in response to confirming absence of a subscription to record to the cDVR storage, transmitting a message to the endpoint device explaining terms for cDVR service before recording the primary content item;
if a subscription to record to the cDVR storage exists, recording the primary content item to the cDVR storage absent storing secondary content items included with the primary content item in the cDVR storage; and
as the primary content item is recorded, inserting one or more pre-roll triggers with the primary content item to trigger provision of secondary content comprising pre-roll content during playback of the primary content item;
in response to a playback command:
retrieving the primary content item from the cDVR storage that is remote from the endpoint device for playback on the endpoint device;
providing the secondary content comprising the pre-roll content with the primary content item according to the one or more pre-roll triggers;
transmitting the primary content item as a stream to the endpoint device so that the pre-roll content is displayed before initially displaying the primary content item with trick play modalities disabled during the display of the pre-roll content;
enabling building a primary content item buffer on the endpoint device during provision of the secondary content comprising the pre-roll content;
enabling storing the secondary content comprising the pre-roll content in a cache of the endpoint device;
monitoring consumption of the stream on the endpoint device for pauses in the playback of the primary content item;
retrieving the secondary content comprising the pre-roll content from the cache of the endpoint device for the stream in response to resuming playback of the stream from a pause; and
in response to resuming playback of the stream from the pause, enabling display of the secondary content comprising the pre-roll content before resuming playback of the primary content item with the trick play modalities disabled during the display of the pre-roll content.

10. The method of claim 9, wherein the pause initiates and concludes in response to trick play commands received from the endpoint device.

11. The method of claim 10, wherein a trick play command initiating the pause signals the endpoint device to clear the primary content item buffer.

12. The method of claim 9, wherein the pause initiates and concludes in response to a trigger inserted into the primary content item when it was recorded to the cDVR storage, the trigger corresponding to secondary content embedded in the primary content item at a time of recording.

13. The method of claim 12, wherein transmitting the primary content item from the cDVR storage for playback on the endpoint device stops n seconds before the trigger in the playback, where n corresponds to a buffer size of the primary content item on the endpoint device, and wherein transmitting the primary content item from the cDVR storage for playback on the endpoint device resumes while transmitting the secondary content for playback on the endpoint device.

14. The method of claim 9, wherein the pause is an interruption of communications between the cDVR application server and the endpoint device and the pause concludes when the communications are restored.

15. The method of claim 9, further comprising terminating transmitting the primary content item from the cDVR storage on detection of the pause.

16. A non-transitory computer readable medium that includes instructions which, when executed, provide for enhanced playback of content recorded on a cloud-based Digital Video Recorder (cDVR) using a cDVR application server by:
in response to receipt of a record command to record a primary content item to a cloud-based Digital Video Recorder (cDVR) storage remote from an endpoint device:
determining if a subscription to record to the cDVR storage that is remote from the endpoint device exists;
in response to confirming absence of a subscription to record to the cDVR storage, transmitting a message to the endpoint device explaining terms for cDVR service before recording the primary content item;
if a subscription to record to the cDVR storage exists, recording the primary content item to the cDVR storage absent storing secondary content items included with the primary content item in the cDVR storage; and
as the primary content item is recorded, inserting one or more pre-roll triggers with the primary content item to trigger provision of secondary content comprising pre-roll content during playback of the primary content item;
in response to a playback command:
retrieving the primary content item from the cDVR storage that is remote from the endpoint device for playback on the endpoint device;
providing the secondary content comprising the pre-roll content with the primary content item according to the one or more pre-roll triggers;
transmitting the primary content item as a stream to the endpoint device so that the pre-roll content is displayed before initially displaying the primary content item with trick play modalities disabled during the display of the pre-roll content;
enabling building a primary content item buffer on the endpoint device during provision of the secondary content comprising the pre-roll content;
enabling storing the secondary content comprising the pre-roll content in a cache of the endpoint device;
monitoring consumption of the stream on the endpoint device for pauses in the playback of the primary content item;

retrieving the secondary content comprising the pre-roll content from the cache of the endpoint device for the stream in response to resuming playback of the stream from a pause; and in response to resuming playback of the stream from the pause, enabling display of the secondary content comprising the pre-roll content before resuming playback of the primary content item with the trick play modalities disabled during the display of the pre-roll content.

17. The non-transitory computer readable medium of claim 16, wherein the cDVR application server is further operable to strip the secondary content items embedded in the primary content item from the primary content item when recording the primary content item and instead store one or more identification codes for the secondary content items.

18. The non-transitory computer readable medium of claim 17, wherein the cDVR application server is further operable to retrieve the secondary content based on an identification code from a secondary content source when transmitting the primary content item to the endpoint device for playback and insert the secondary content in the primary content item.

19. The non-transitory computer readable medium of claim 18, wherein the secondary content inserted in the primary content item is different from the secondary content items stripped from the primary content item based on a time of playback and a location of consumer at the time of playback.

20. The non-transitory computer readable medium of claim 16, wherein the cDVR application server is further operable to send the message with terms for a consumer to accept before recording the primary content item in the cDVR storage.

* * * * *